(12) United States Patent
Hill et al.

(10) Patent No.: US 9,039,293 B2
(45) Date of Patent: May 26, 2015

(54) MULTIPORT OPTICAL FIBER TERMINAL

(71) Applicant: CLEARFIELD, INC., Plymouth, MN (US)

(72) Inventors: John P. Hill, Plymouth, MN (US); Walter E. Power, II, Plymouth, MN (US); Randy Van Horn, Plymouth, MN (US)

(73) Assignee: Clearfield, Inc., Plymouth, MN (US)

( * ) Notice: Subject to any disclaimer, the term of this patent is extended or adjusted under 35 U.S.C. 154(b) by 0 days.

(21) Appl. No.: 14/080,783

(22) Filed: Nov. 14, 2013

(65) Prior Publication Data

US 2014/0133806 A1 May 15, 2014

Related U.S. Application Data

(60) Provisional application No. 61/726,342, filed on Nov. 14, 2012.

(51) Int. Cl.
*G02B 6/38* (2006.01)
*G02B 6/44* (2006.01)

(52) U.S. Cl.
CPC ............ *G02B 6/3857* (2013.01); *G02B 6/3826* (2013.01); *G02B 6/44* (2013.01)

(58) Field of Classification Search
USPC ............. 385/16, 17, 18, 76, 77, 88, 134, 135, 385/136, 139
See application file for complete search history.

(56) References Cited

U.S. PATENT DOCUMENTS

| 7,120,347 | B2 * | 10/2006 | Blackwell et al. | 385/135 |
| 7,333,708 | B2 * | 2/2008 | Blackwell et al. | 385/135 |
| 7,740,409 | B2 * | 6/2010 | Bolton et al. | 385/89 |
| 8,649,649 | B2 * | 2/2014 | Smith et al. | 385/136 |
| 8,699,838 | B2 * | 4/2014 | Andrzejewski et al. | 385/49 |
| 8,909,019 | B2 * | 12/2014 | Fabrykowski et al. | 385/135 |

* cited by examiner

*Primary Examiner* — Akm Enayet Ullah
(74) *Attorney, Agent, or Firm* — Pepper Hamilton LLP

(57) ABSTRACT

A multiport optical fiber connection terminal with a compact footprint has a configuration that allows for easy accessibility and interconnection of cables, while providing several mounting options and including storage space within the terminal. The terminal may include cable connectors that are configured to allow for weather proof installation of pre-terminated fiber optic cables with the terminal ports.

20 Claims, 16 Drawing Sheets

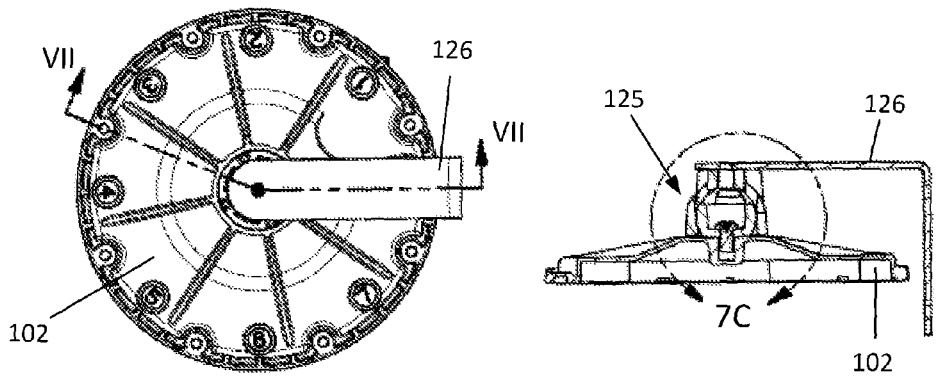
FIG. 7A
FIG. 7B
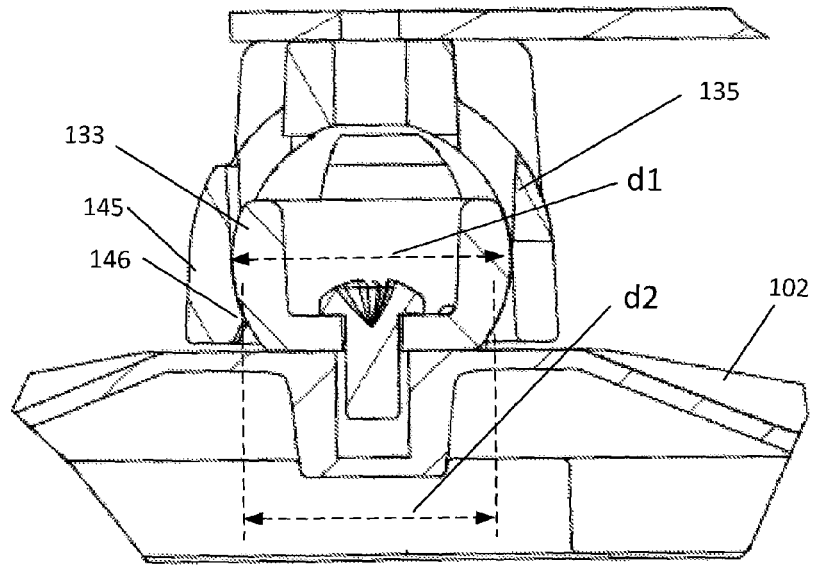
FIG. 7C

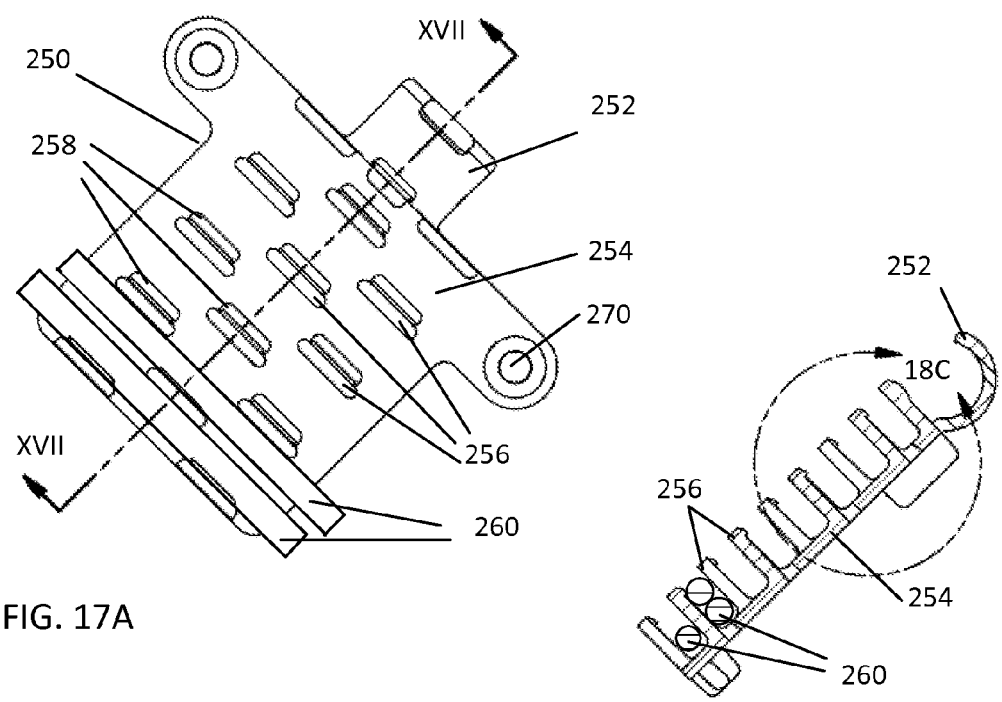
FIG. 17A
FIG. 17B
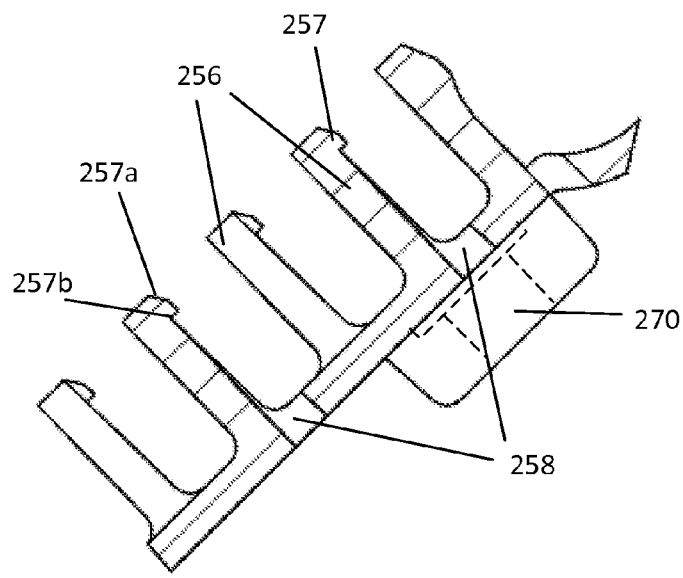
FIG. 17C

MULTIPORT OPTICAL FIBER TERMINAL

CROSS-REFERENCE TO RELATED APPLICATION

This application claims the benefit of U.S. Provisional Application No. 61/726,342, filed Nov. 14, 2012.

BACKGROUND

The use of fiber optics for communications purposes continues to grow. Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. Each connection or coupling requires a connector and adaptor to align the fibers such that the light can transmit without interruption, and in instances when the connection may be exposed to weather conditions, an essentially waterproof configuration of components.

With the increasing desire for completely optical networks, FTTP/FTTH—"fiber to the premises" or "fiber to the home" systems are being developed to provide optical fibers that extend from the source to the site of the end-user. For this purpose, optical connection terminals are used for interconnection of the feed lines from the source with drop cables that extend to various user locations within a certain distance from the terminals.

To interconnect the cables, numerous, different, cable connector designs provide for low insertion loss and stability. Some example connectors may include, but are not limited to, SC, Dual LC, LC, ST and MPO connectors. In most of these designs, ferrules (one in each connector, or one in the connector and one in the apparatus or device), each containing an optical fiber end, are butted together end to end and light travels across the junction. Zero insertion loss requires that the fibers in the ferrules be exactly aligned, a condition that, given the necessity of manufacturing tolerances and cost considerations, is virtually impossible to achieve, except by fortuitous accident. Since the mechanical tolerances involved in terminating optical fiber are stringent in most applications, optical fiber is generally not terminated on site. In situations wherein optical fiber must be terminated on site, it may take a skilled technician between about 15 to 20 minutes to splice the fibers together using specialized splicing equipment. Optical fiber is therefore often provided in a range of different lengths, factory pre-terminated at both ends with a connector plug ready to plug into a matching receptacle.

Aerial splice closures and pre-engineered networks are some of the available configurations for providing receptacles for fiber cable connection and distribution. Aerial splice closures are typically suspended from cables above the ground and require substantial expertise to configure the connections within the closure out in the field. For example, it is often difficult to gain access to the closure and to identify an optical fiber of the distribution cable to be interconnected with an optical fiber of a particular drop cable. Once identified, the optical fibers of the drop cables are typically joined directly to the optical fibers of the distribution cable using conventional splicing techniques, such as fusion splicing, that is very time consuming and requires a highly skilled field technician. It is often labor intensive, and therefore costly, to reconfigure the existing optical connections or to add additional optical connections in an aerial closure.

Pre-engineered, factory prepared systems allow for less skilled technicians to perform system connections. Pre-engineered networks, however, require fairly precise layouts and design to determine the configuration of components and lengths of fiber that are to be pre-made and installed on site. Simple miscalculations, or unforeseen circumstances may then result in timely delays. For example a pre-finished length of fiber cable may end up being too short, requiring another cable to be ordered and manufactured. As a result, it may be inconvenient, hazardous or even impossible to make the necessary interconnections of pre-made optical fibers.

Existing types of connection devices generally require a large amount of space within the connection enclosure to accomplish splicing or interconnecting functions. In addition, to further reduce costs and provide a more aesthetically pleasing appearance, interconnection enclosure are often placed within, or hidden within a hand-hole, vault, network terminal, or pedestal having the smallest possible volume, which can make it difficult to work within such enclosures.

There remains a need to provide a multiport connection terminal for interconnecting one or more drop cables with a fiber optic feed cable at a desired branch point in a fiber optic network, wherein the connection terminal is compact to fit within mounting enclosure such as the hand-hole vault, etc., easily configurable by a relatively unskilled technician, and allow for relatively easy interconnection of an optical fiber of at least one pre-connectorized optical fiber drop cable and a respective pre-terminated optical fiber feed cable.

SUMMARY

Multiport optical fiber connection terminals may be configured with a compact footprint while having a configuration that allows for easy accessibility and interconnection of cables.

In an embodiment, a multi-port connection terminal for optical fibers includes a housing having a first housing portion, and a second housing portion attachable to the first housing portion to define an interior space within the housing, wherein at least one of the first housing portion and the second housing portion define a perimetrical wall disposed about at least a portion of the interior space, a plurality of connector ports provided in one of the first housing portion and the second housing portion and extending through the housing portion from the interior space to an exterior space outside of the housing, and a fiber routing and slack storage system disposed radially inwardly adjacent the perimetrical wall around at least a portion of the interior space for routing and storing excess lengths of optical fiber within the internal cavity.

In an embodiment, a multi-port connection terminal for optical fibers includes a housing having a first housing portion having a base and a cylindrical perimetrical wall extending from the base, with the cylindrical perimetrical wall having an annular edge disposed away from the base, and a cover for being attached on the annular edge of the cylindrical perimetrical wall to, together with the first housing portion, define an interior space, a plurality of connector ports disposed in the base and extending through the base from the interior space to an exterior space outside of the housing, and at least one hanging feature disposed on at least one of the first housing portion and cover for supportively suspending the terminal from a support structure with the base oriented downwardly.

BRIEF DESCRIPTION OF THE FIGURES

FIGS. 7A-7C depict cross-sectional views of a ball and socket hanger according to an embodiment.

FIGS. 17A-17C provide various views of an accessory holder according to an embodiment.

DETAILED DESCRIPTION

A multiport optical fiber connection terminal may include a plurality of connector ports that receive optical connectors for interconnecting one or more fiber optic drop cables with a distribution cable at a branch point in a fiber optic communications network. The various embodiments may be applied in an optical "fiber-to-the-premises" (FTTP) network. As used herein the term "drop cable" may generally refer to a fiber optic cable comprising a cable sheath or jacket surrounding at least one optical fiber. The term "distribution cable" or "feed cable" may refer to any of a main feeder cable, a distribution cable, and a branch cable, and may be any type of fiber optic cable having a fiber count greater than that of the drop cable. The term "optical fiber" is intended to include all types of single mode and multi-mode light waveguides, including one or more bare optical fibers, loose-tube optical fibers, tight-buffered optical fibers, ribbonized optical fibers or any other expedient of a medium for transmitting light signals. Pre-connectorized drop cables may be readily connected to and disconnected from the connector ports of the multiport optical fiber connection terminal, thus eliminating the need for entering the multiport terminal, and eliminating the need for splicing of the optical fibers of the drop cables to optical fibers of a stub cable.

Figure 1:
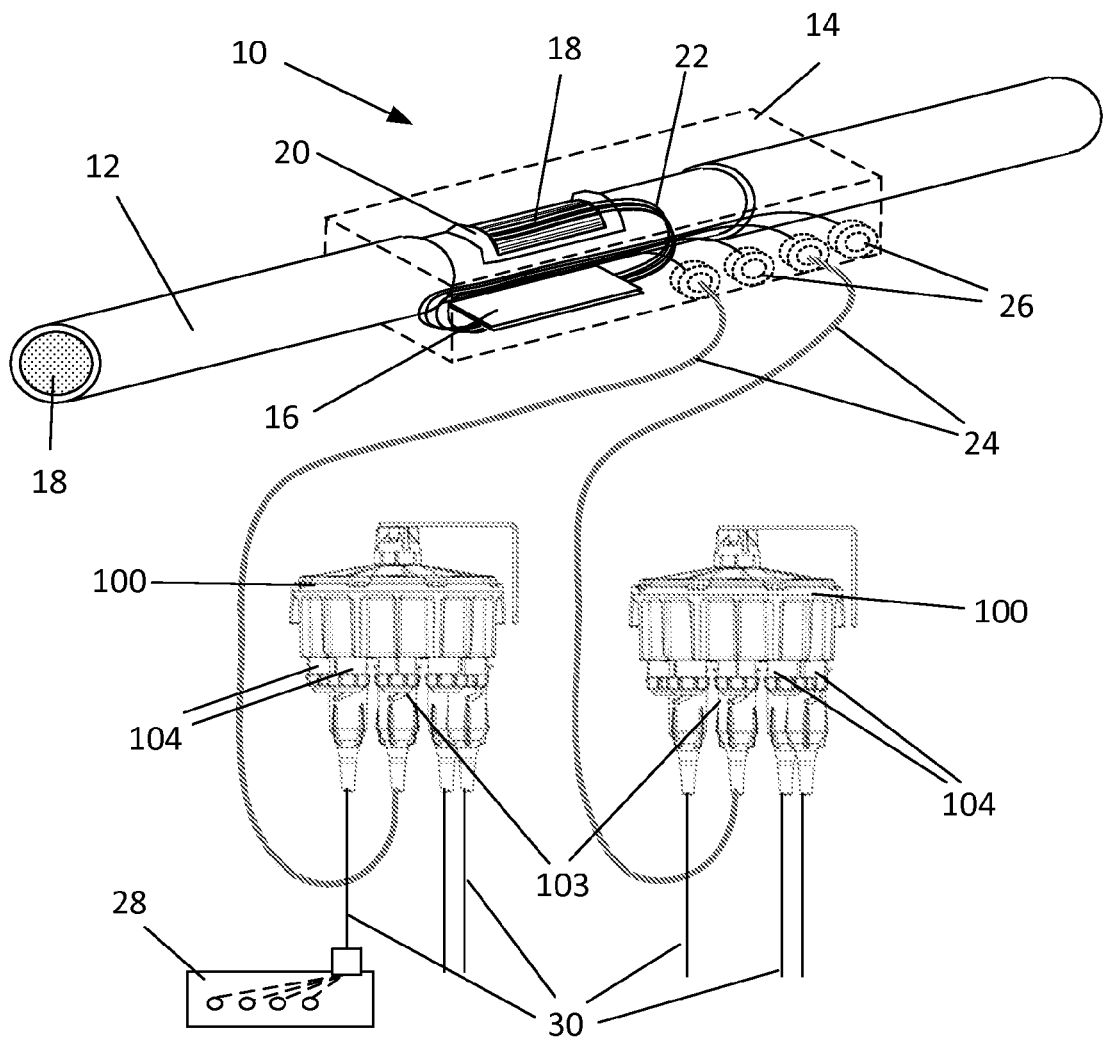
FIG. 1 depicts a general illustration of a fiber optic network according to an embodiment.

A fiber optic communications network, as shown in FIG. 1, may include at least one fiber optic distribution cable 12 typically having a plurality of mid-span access locations 10 along the length of the distribution cable. The distribution cable 12 may be pre-engineered with factory prepared mid-span access locations 10, or the mid-span access locations may be field-prepared at branch points on existing distribution cable. The mid-span access locations 10 provide access to optical fibers 18, and guide the optical fibers out of the distribution cable 12 via a transition element 20. Protective sheaths 22 may be included to guide the fibers 18 from the distribution cable 12 without excessive stress, strain or bending, into one or more splice trays 16 where the ends of the optical fibers 18 may be spliced to respective optical fibers of a stub cable 24. he stub cable 24 may extend to a multi-port optical connection terminal 100 that may be positioned a distance away from the distribution cable 12 in, or on, for example, a telephone pole, a hand-hole, a vault or a pedestal. The components at the mid-span access location 10 may be enclosed in a housing 14 that allows for access to the components while providing protection from the environment.

The optical fibers 18 and/or the optical fibers of the stub cable 24 may be pre-connectorized in the factory, or may be connectorized in the field, and the splice trays 16 may then be replaced with connector adapter sleeves. The optical fibers of the stub cable 24 may enter the housing 14 through a suitable cable port 26 provided through an exterior wall of the housing. The stub cable 24 may include at least one, and typically includes a plurality of optical fibers disposed within a protective cable sheath. The stub cable 24 may be any type of fiber optic cable having a fiber count equal to or less than that of the distribution cable 12. The stub cable 24 may be flexible and may include a tubular body, such as, but not limited to, a buffer tube, a monotube or a tube formed from a water-swellable tape. The stub cable 24 may conduct the optical fibers from the housing 14 into the multi-port optical connection terminal 100 through a stub cable port 103. As discussed further below, the ends of the optical fibers of the stub cable 24 within the multi-port optical connection terminal 100 may be pre-connectorized and the optical connectors may be inserted into an adapter sleeve seated in a respective one of the connector ports 104. Pre-connectorized drop cables 30 may be interconnected with a respective connectorized optical fiber of the stub cable 24 by inserting the pre-connectorized end of the drop cable into the adapter sleeve seated in the connector port 104 from the exterior of the multi-port optical connection terminal 100. The stub cable port 103 of the multi-port optical connection terminal 100 sealingly receives the stub cable 24 and the plurality of connector ports 104 provide a sealable connection for the connectorized ends of the drop cables 30. The drop cables 30 may include at least one single mode or multimode optical fiber of any type optically connected to a single fiber or multi-fiber optical connector. The other ends of the drop cables 30 may be optically connected to respective optical fibers of a communications network within a connection terminal 28 at an end user's premises. The connector terminal 28 may be, for example, an outside plant network access point (NAP) closure, local convergence cabinet (LCC), terminal, pedestal or network interface device (NID). With such a configuration, each drop cable 30 may be routed a shorter distance from the respective terminal 100 to a subscriber NID 28 than from the mid-span access location to the subscriber NID. The optical fiber cables may be pre-connectorized with any of SC, Dual LC, LC, ST and/or MPO connectors.

Multi-port optical connection terminals 100 may provide convenient connection points in a fiber optic communications network for a relatively unskilled field technician to connect, disconnect and reconfigure optical connections between drop cables 30 and the distribution cable 12. For example, a field technician may readily reconfigure an existing drop cable 30 connection with the multi-port optical connection terminal 100, or may connect additional drop cables without disturbing the previously configured drop cables.

Figure 2A:
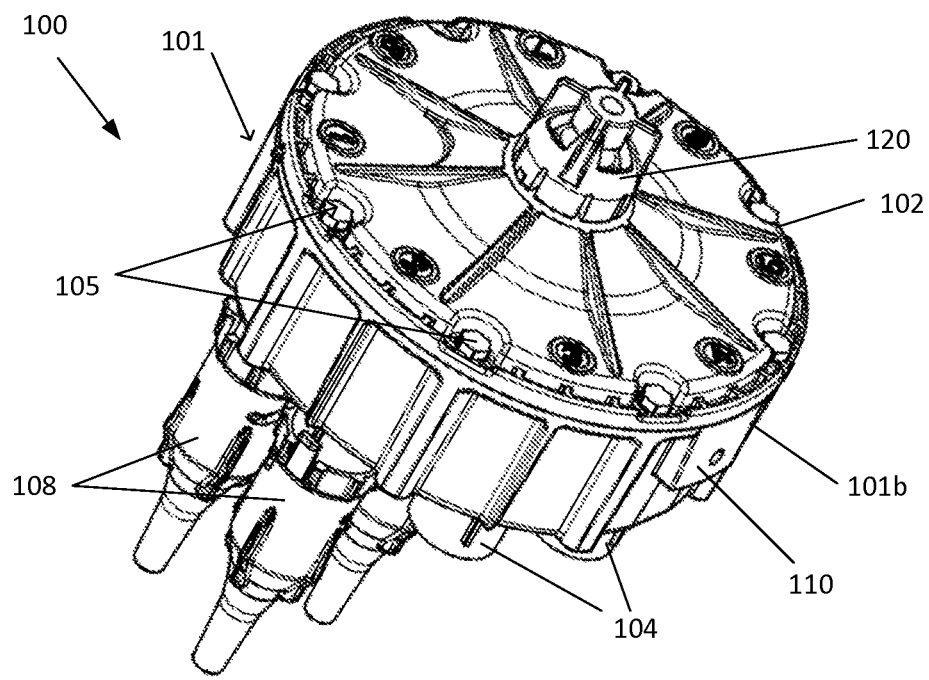
FIGS. 2A-2B depict perspective views of a multiport optical fiber connection terminal according to an embodiment.
Figure 2B:
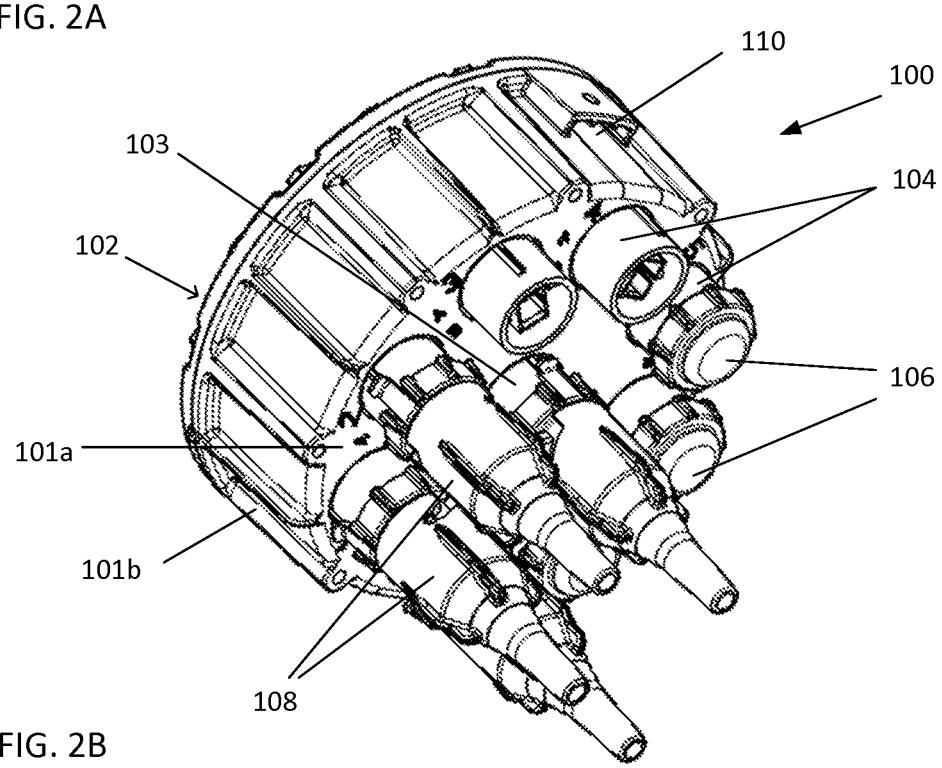

More detailed perspective views of a multi-port optical connection terminal 100 according to an embodiment are provided in FIGS. 2A and 2B. As shown in the embodiment of FIGS. 2A and 2B, the terminal 100 may have a housing body portion 101 and a separable cover portion 102. The body portion 101 may include a base portion 101a that includes the ports 103 and 104, and a wall portion 101b that extends away from the base portion to define a substantially cylindrical wall, giving the body portion an essentially bowl-shaped configuration (shown in greater detail in FIGS. 6A and 6B).

The cover portion 102 and body portion 101 may be releasably fastenable to one another by a variety of different fastening arrangement. In an embodiment as shown in FIG. 2A, the cover portion 102 may be fastened to the body portion 101 by a plurality of screws/bolts 105, that extend through the cover and engage with the material of the body portion. Other types of releasable fastening configurations may include, for example, resilient tabs on one portion that engage with catches on the other portion, clips that may be pivotally attached to one portion to pivot around and engage with a catch of the other portion, a threaded engagement wherein threads of one portion may engage with threads of the other portion, or a bayonet-type mount. The body portion 101 and the cover portion 102 may be formed of rigid material, such as polymers or metal. In an embodiment, the material may be a lightweight material. As an example, the body portion 101 and the cover portion 102 may be formed of a thermoplastic material.

Figure 3A:
FIGS. 3A-3E depict various port layout profiles and housing shapes according to embodiments.
Figure 3B:
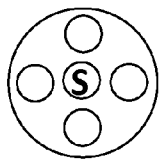
Figure 3C:
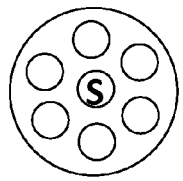
Figure 3E:
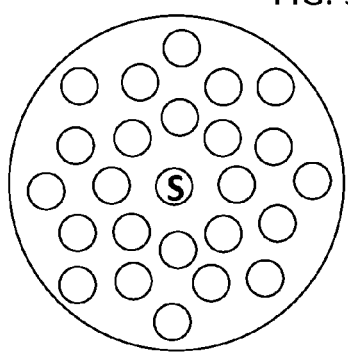
Figure 3D:
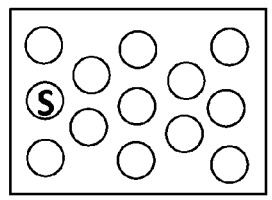

In an alternative configuration (not shown), the side wall portion 101b may extend from and be integral with the cover portion 102, instead of from the base portion 101a. Or, each of the base portion 101a and the cover portion 102 may provide a portion of side wall portion 101b. For example, half of the height of the side wall portion 101b may extend from and be integral with the base portion 101a, and the other half of the height of the side wall portion 101b may extend from and be integral with the cover portion 102. In a still further variant, the wall portion 101b may be a separate component from each of the base portion 101a and the cover portion 102, with each of the base portion and the cover portion being fastenable to the wall portion. In further variants, the wall portion 101b may include sections that each define a portion of the circumference, and some or all of the wall sections may be removable to provide variations on access to the interior space defined within the body portion 101 and the cover portion 102. In addition to a cylindrical-shaped wall 101b, the housing and wall portion 101b may have alternative shapes, such as ovular, as represented in FIG. 3A, for example, or rectangular, as represented in FIG. 3D.

Figure 4A:
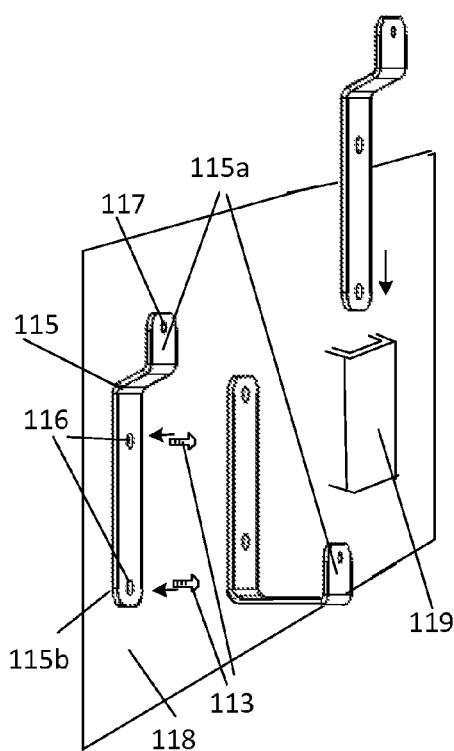
FIGS. 4A-4B depict a hanger and hanging configurations according to embodiments.
Figure 4B:
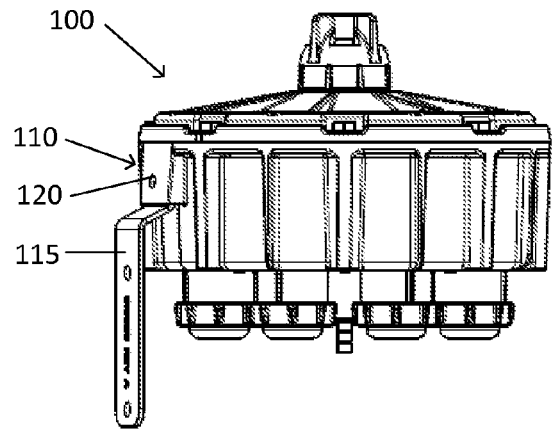
Figure 12A:
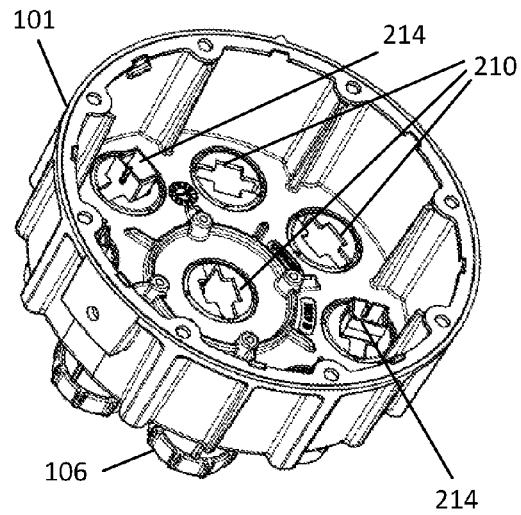
FIGS. 12A and 12B provide interior and exterior views of a terminal housing according to embodiments.
Figure 12B:
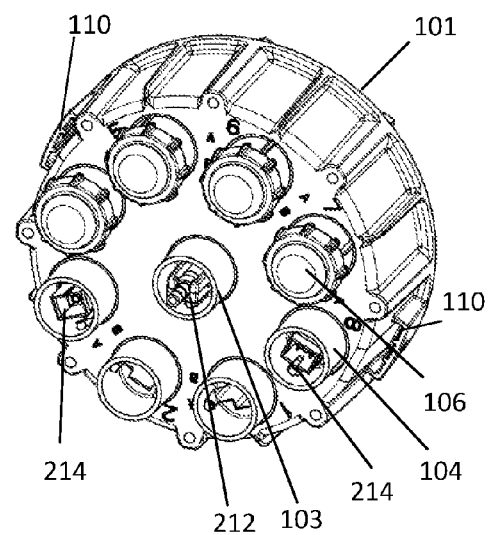

The wall portion 101b may include at least one hanger attachment slot 110 that may be configured for receipt of a terminal hanger 115 therein as depicted in FIGS. 4A and 4B. In an embodiment, as shown in FIG. 12B, there may be two hanger attachment slots disposed on opposite sides of the terminal 100 at 180° from one another. In a variant embodiment (not shown), the wall portion 101b may include four hanger attachment slots 110 disposed at 90° from one another, or 3 at 120°, or 6 at 60°, or any number of slots to provide increased flexibility in the position in which the terminal 100 is to be installed. A hanger 115 may include an upper hanger portion 115a that fits into the attachment slot 110, and a lower hanger portion 115b that may include holes 116 for fastening the hanger to a surface 118 by means of screws or nails 113, for example. Alternatively, the lower portion 115b may be inserted into a hanger holder 119 that is pre-attached or existing on a surface. The surface 118 may be a surface of a wall, a hand-hole, a vault, a network terminal, a pedestal, or any other surface to which it may be desirable to mount such a terminal 100. Variations on the configuration of the hanger attachment slots 110 may also be provided to adapt such a terminal 100 to be installed on various other brackets, or projections, etc. If it may be necessary to attach the hanger 115 to the terminal 100, a hole 116 may be provided in the upper portion 115a so that a screw may be passed through a hole 120 of the housing and through the hole 116 to retain the hanger with the terminal when the terminal is moved.

Figure 5A:
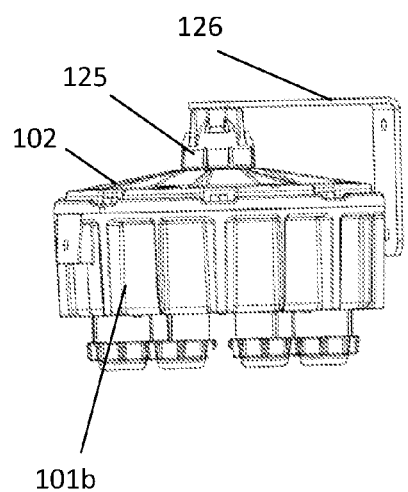
FIGS. 5A-5B depict an alternative hanger and hanging configurations according to embodiments.
Figure 5B:
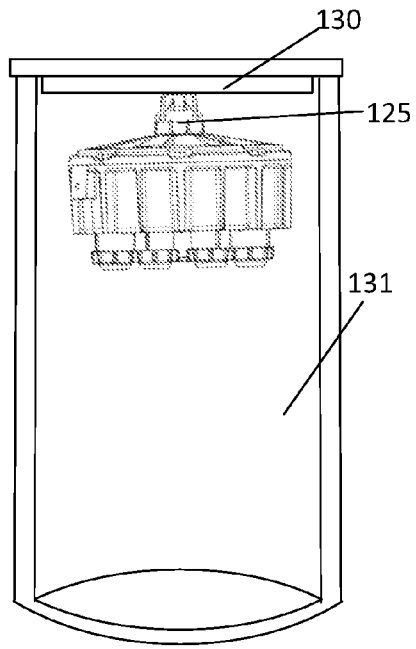

In an embodiment as depicted in FIGS. 5A-5B, the terminal 100 may also be installed via a top hanger assembly 125 that may be a component of the cover 102, or as discussed further below, a component that may be attached to the cover. In a similar manner as discussed above with respect to the hanger 115, a hanger bracket 126 may be fastened to a vertical surface, and the top hanger assembly 125 may be fastened to a protruding horizontal extension of the hanging bracket 126. Alternatively, the top hanger assembly 125 may be directly connected to a horizontal surface 130 as shown in FIG. 5B to suspend the terminal 100 directly from the surface. The horizontal surface may be the ceiling of a closet space, or for example, as shown in FIG. 5B, a lid of a pedestal 131 that may be at least partially buried in the ground.

In an embodiment as shown in FIGS. 6A, 6B and 7A-7C, the top hanger assembly 125 may be separable from the cover 102. The top hanger assembly may be configured as a "ball-and-socket" arrangement having a first ball-shaped component 133 that may be fastenable to the cover 102, and a second socket component 135 that may be fastenable to a surface, such as the surface 130 or the hanger bracket 126, in a manner as illustrated in FIGS. 5A and 5B. In an alternative configuration (not shown), the ball-shaped component may be fastenable to a surface, such as the surface 130 or the hanger bracket 126, and the socket component may be fastenable to the cover 102.

Figure 6A:
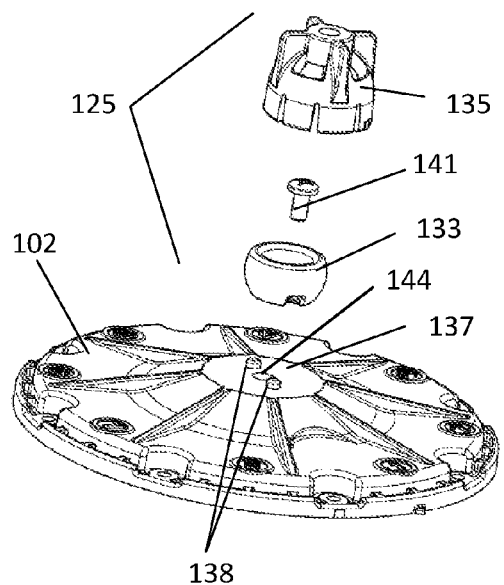
FIGS. 6A-6B depict various views of a cover and a ball-and-socket hanger according to an embodiment.
Figure 6B:
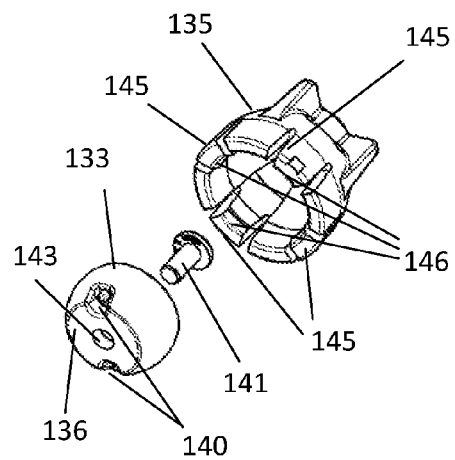

In an embodiment as shown, the ball-shaped component 133 may have an exterior surface which is at least partially spherical. FIGS. 6A and 6B show an exploded view of the components of the top hanger assembly 125, while FIGS. 7A-7C show assembled views. A bottom surface 136 of the component 133 may be flat to sit on a flat central portion 137 of the cover 102. In addition, to prevent rotation of the component 133 on the cover 102, at least one of the surfaces 136 and 137 may include at least one projection, such as projections 138 shown on the surface 137 of cover 102, that may fit into corresponding recesses 140 on at least one of the other of surfaces 136 and 137, such as recesses 140 shown on the surface 136. Alternative configurations of anti-rotation features may also be provided. The ball-shaped component 133 may be removably fastened to the cover 102 by means of a bolt or screw 141 that passes through a bore 143 of the ball-shaped component 133 and into a receiving bore 144 of the cover 102. In a variant thereof, the ball-shaped component may be an integral part of the cover 102, and may be integrally molded therewith.

The socket component 135 may be configured to fit around and 'snap onto' the ball component 133. The interior configuration of the socket component 135 may be configured to be substantially the same as the exterior configuration of the ball component 133 so that the socket component fits snugly around the ball component with essentially little, or no play therebetween. The ball component 133 may have a maximum external diameter (d1). A leading edge 135a of the socket component 135 may be configured to have a size that fits over, or accommodates the external diameter (d1) as the socket component is fitted over the ball component 133. The socket component 135 may have at least one, or a plurality of resilient tabs 145 that include an internally projecting flange 146 such that an internal diameter (d2) at the flange is less than the external diameter (d1) of the ball component 133.

Upon application of an appropriate force to push the ball component 133 into the socket component 135, the ball component may pass between the flanges 146 and the flanges may deflect the resilient tabs 145 outwardly so that the internal diameter between the flanges matches the diameter (d1) to accommodate passage of the ball component therethrough. Upon passage of the ball component 133 into the interior of the socket component 135 (as shown in FIGS. 7B, 7C) the tabs 145 may return to substantially their original position to retain the ball component within the socket component. It should be noted that because of the cross-sectional view taken in FIG. 7A, only the left hand flange 146 is depicted in FIG. 7C. As shown in FIG. 6B, four such tabs may be present and disposed at about 90° from one another. Alternatively, three tabs may be present at about 120°, or two tabs at 180°. In an embodiment, only one such tab may be sufficient for retaining the ball component 133 within the socket component 135.

The same deflections essentially apply for removal of the ball component 133 from the socket component 135. Upon application of an appropriate force to pull the ball component 133 out of the socket component 135, the ball component may pass between the flanges 146 and the flanges may deflect the resilient tabs 145 outwardly, wherein the tabs may return to their original position upon passage of the ball therethrough.

In alternative embodiments, instead of two components that snap together via a ball and socket configuration, other configurations for the top hanger assembly 125 may also be provided. For example, two components that may snap together via an alternative configuration, or join together by means of a bayonet type coupling, or via a threaded coupling.

In various alternative embodiments, other types of hanger configurations may also be provided, such as, for example, a wire or bar hanger that may, at one end, hook into the lid 102 or another portion of the housing 101 (for example, slots 110), and at the other end, also include a hook for hanging the terminal 100 from another hook or rail, etc.

In an embodiment, the base portion 101a may include at least one stub cable port 103 as shown in FIG. 2B for providing an inlet port for receiving the fiber optic cables of the stub cable 24. In addition, a plurality of ports 104 may be included for connection with drop cables 30. In an embodiment as shown in FIGS. 2A and 2B, the stub port 103 may be substantially centrally located and eight drop ports 104 may be disposed therearound in a circular arrangement of ports. While eight drop ports 104 and one stub port 103 are shown, various alternative configurations may also be provided in alternative embodiments. For example, if fewer ports are needed, a 2-drop, 4-drop or 6-drop arrangement may be configured as respectively shown in FIG. 3A, 3B or 3C, wherein 'S' represents a stub port 103. Alternatively, if more ports are needed, a 12-drop arrangement may be configured as represented in FIG. 3D, or a 24-drop arrangement may be configured as represented in FIG. 3E.

While various arrangements of ports are shown, the array of ports may be configured in alternative variants to minimize the surface area of the base portion 101a. In an embodiment, a circular array of nine ports as configured in FIGS. 2A and 2B, may occupy less area than the same nine ports in a rectangular array.

As depicted in FIG. 2B, the ports 103 and 104 may be configured to accept protective caps 106 to cover ports that are not being used, protect the internal components during transport of the terminal 100, and/or prevent moisture and insects from entering the terminal. An embodiment of the ports 103, 104 and cap 106 is represented in FIGS. 8A-8D.

Figure 8A:
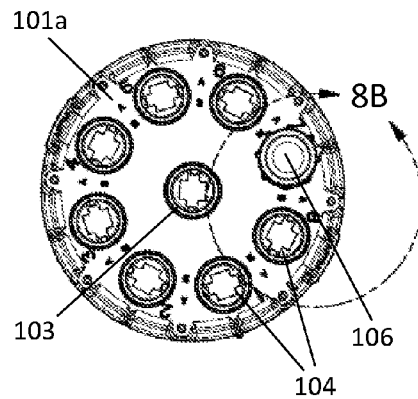
FIGS. 8A-8D provide various views of terminal ports and associated caps according to an embodiment.
Figure 8B:
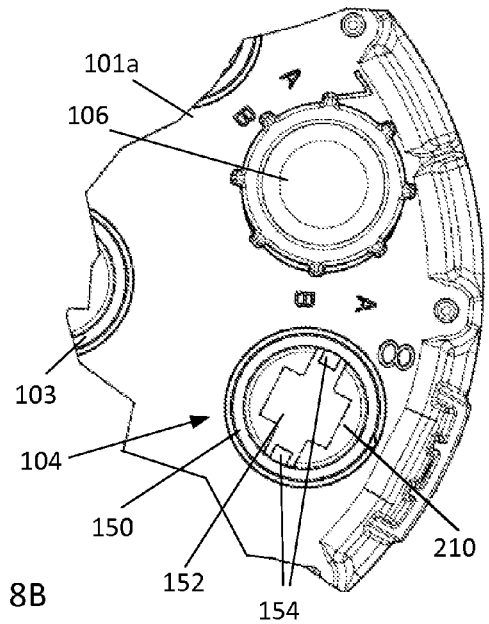
Figure 8C:
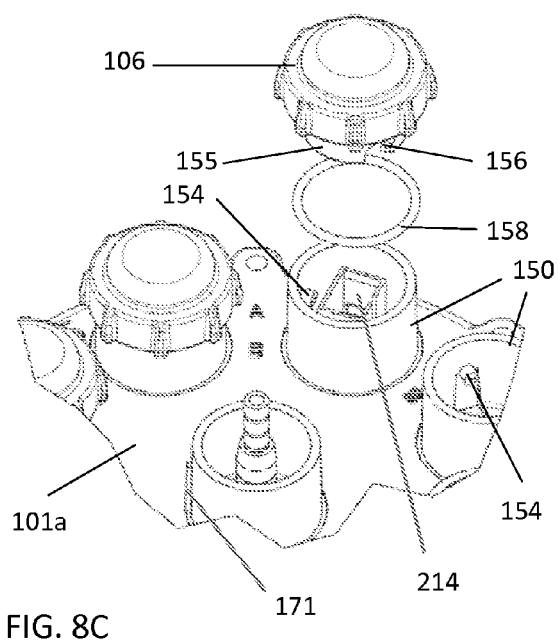

As indicated above, a terminal 100 may include at least one stub port 103 and at least one drop port 104. FIG. 8A depicts a bottom view of one embodiment of a terminal 100 that includes a central stub port 103 and eight drop ports 104 disposed in a circular configuration around the stub port. FIG. 8B shows a detail of FIG. 8A, and FIG. 8C provides a perspective view of the ports. Each port may include a cylindrical wall 150 that defines an internal passage 152 into the housing 101. The interior of the wall 150 may include pins 154 that project inwardly from the wall to provide retention pins for connecting caps 106, connectors 108 (see FIG. 2B), or alternative devices (not shown) to the ports in a manner as discussed below.

Figure 8D:
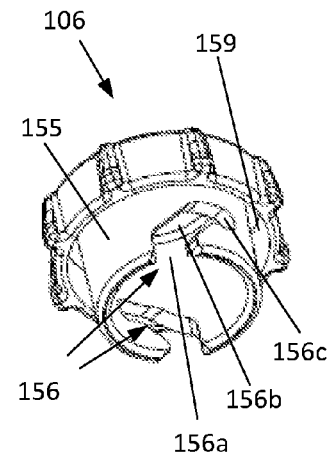
Figure 9A:
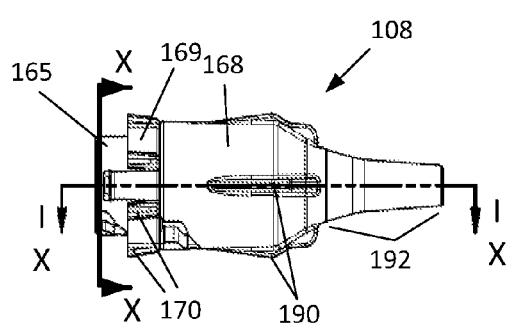
FIGS. 9A-9C provide various views of a connector according to an embodiment.
Figure 9B:
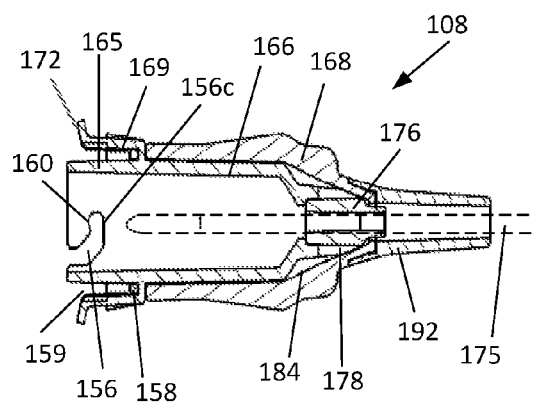
Figure 9C:
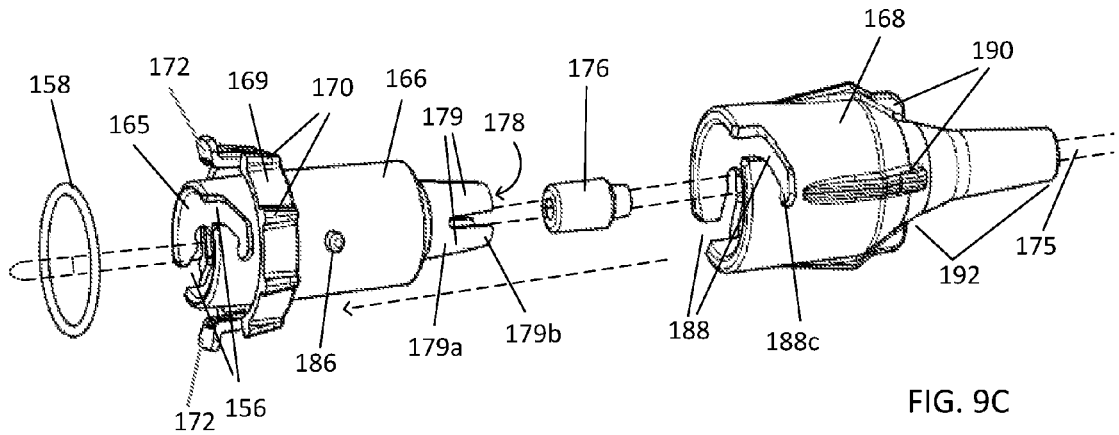

As shown in FIGS. 8A-8C and 9A-9C, caps 106 and connectors 108 may include a cylindrical wall portion 155, or 165 respectively, that fits within the wall 150 of the ports 103, 104. The wall portions 155, 165 may include corresponding engagement slots 156, in a manner as shown in FIG. 8D or 9C, for example, that are configured to receive the pins 154 therein. Slots 156 and pins 154 may be configured to function as a bayonet-type connection, whereby the slots may have a slot entry portion 156a for accepting a pin therein in a relative axial direction of movement of a cap 106, or connector 108 as discussed further below, into a port. The slots 156 may include an intermediate angled portion 156b that move along the pin 154 during insertion of a cap 106, causing the cap (or connector) to move both in an axial direction as well as causing a rotational movement of the cap (or connector) within the port. The slots 156 may terminate at a locking portion 156c configured for engaging the pin 154 and retaining the cap (or connector) in place on a port (see also FIG. 9B). In an embodiment, the cap 106 may include external gripping features, such as raised axial ridges 107 that may allow for the cap to be more easily grasped and turned when placing the cap onto, or removing the cap from a port 103, 104. While axial ridges are shown, other gripping features, such as a textured surface or rubberized surface, for example, may also be provided.

A sealing member, such as an O-ring 158 may be provided for being inserted into a channel 159 in the cap 106 (or connector 108). In addition to providing a sealing function to seal the port openings, the sealing member may also provide a degree of biasing to apply a force to the cap (or connector) in an axially outward direction when seated in the port. This biasing force may engage the pin 154 in the locking portion 156c so that to seat the cap (or connector) on a port, an additional inward axial force may be needed to slightly compress the sealing member 158 upon a final rotation to thereby allow for movement of the pin 154 into the locking portion. The slightly compressed sealing member 158 may then bias the pin into a locking recess 160 (FIG. 9B) provided in the locking portion 156c. An axially inward force may then be necessary for removal of the cap 106 (or connector 108) to disengage the pin 154 from the locking portion 156c and allow for rotational movement of the cap (or connector) within the port for removal of the cap (or connector).

In the depicted embodiment, wherein the port walls include two pins 154 and the cap 106 includes two corresponding slots 156, the cap may essentially be placed over a port 103, 104 in either of two positions rotated at 180° from one another. In alternative embodiments, for example, three pins-three slots, a cap may be placed on a port in any of three positions rotated at about 120° from one another, or, four pins-four slots, a cap may be placed on a port in any of four positions rotated at about 90° from one another. In an embodiment, it may also be desirable for a cap to be installed in only one way/position, wherein a single pin-single slot configuration may be provided.

An embodiment of a fiber optic cable connector 108 is depicted in detail in FIGS. 9A-9C. In an embodiment as shown, the connector 108 may have two housing parts, an internal housing 166 that includes the wall portion 165 that is received within a port 103, 104, and an external housing cover 168. As discussed above, the internal housing 166 may be fastened to the ports 103, 104 via the slots 156 that receive pins 154 therein. The internal housing 166 may include a capping portion 169 concentric with and spaced apart from the inner wall 165 to define the channel 159 that receives the port wall 150 therein. A sealing member, such as an O-ring 158, for example, may also be provided in the channel 159 to provide a moisture-tight seal of the internal housing 166 to a port wall 150.

Similar to the cap 106, the capping portion 169 of the internal housing 166 may include external gripping features, such as raised axial ridges 170, that may allow for the housing to be more easily grasped and turned when placing the housing onto, or removing the housing from a port 103, 104. While axial ridges 170 are shown, other gripping features, such as a textured surface or rubberized surface, for example, may also be provided.

Figure 10:
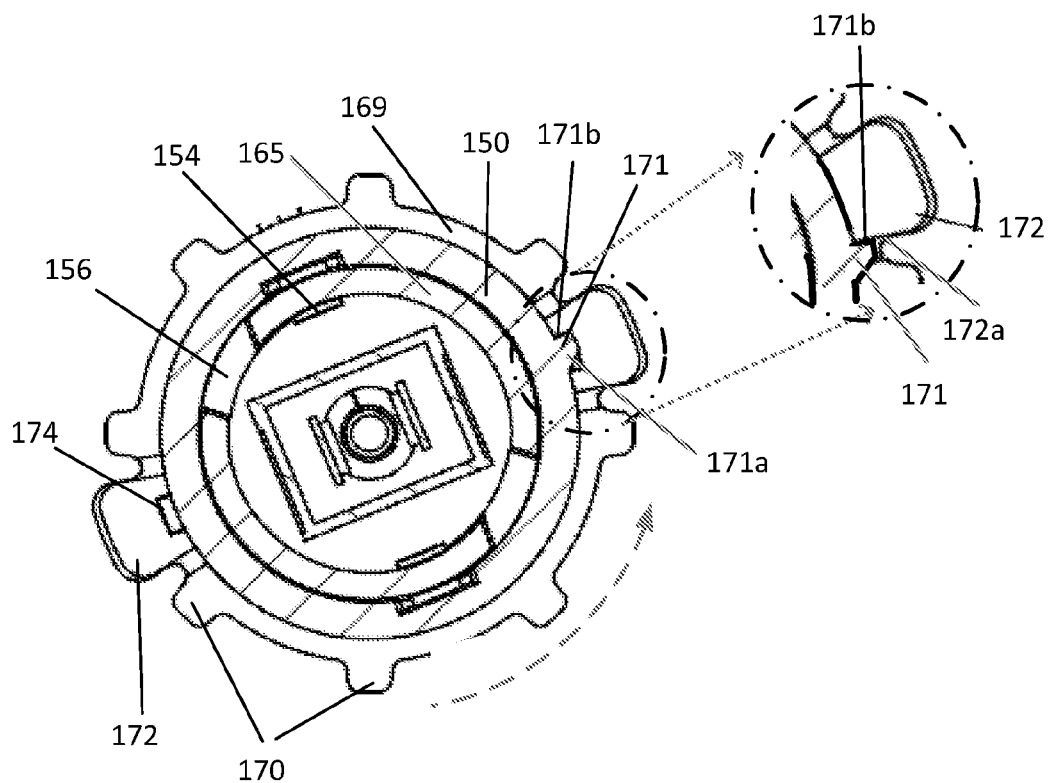
FIG. 10 illustrates a lockable fitting for a connector according to an embodiment.

In an embodiment as represented in more detail in FIG. 10 (in a view taken essentially along X-X in FIG. 9A, but also including port wall 150), the connectors 108 may include an additional locking feature for locking the connectors to a port. The external side of the port wall 150 may be provided with an axial ridge 171 (shown also in FIG. 8C), and the capping portion 169 of the internal housing 166 may include at least one resilient extending tab 172 (see also FIG. 9C).

Upon insertion of a housing 166 onto the port wall 150, with an axial and rotational movement, with rotation in the direction of the arrow in FIG. 10, a tab 172 may move along the outside of the wall 150, and upon encountering a ridge 171, may deflect radially outwardly as the tab rides up the canted surface 171a. Upon further rotation to the position as shown in FIG. 10, a recess or slot 174 in the tab 172 may allow the tab to resiliently return to its original configuration so that the squared surface 171b of the ridge 171 is engaged by the tab 172 to inhibit or prevent a reverse rotational movement in a direction counter to the arrow shown.

To remove an internal housing 166 from a port, the engaged tab 172 must be forced/pulled radially outwardly a distance sufficient for the tab to clear the ridge 171 so that the housing may be rotated in the opposite direction. In a variant embodiment, instead of the tabs 172 having a recess or slot 174 for engaging the squared surface 171b, the trailing edge 172a of the tab (as shown in the inset drawing in FIG. 10), may engage the squared surface 171b. In an embodiment, caps 106 may also be provided with tabs 172 to make the caps more secure.

In the depicted embodiment, wherein the port walls 150 include two pins 154 and the housing wall 165 includes two corresponding slots 156, the internal housing 166 may essentially be placed over a port in either of two positions rotated at 180° from one another—as was discussed previously for he caps 106. As such, the internal housing 166 may include two tabs 172 disposed opposite one another, as shown, corresponding to each of the installation positions. Alternatively, if only one tab 172 is provided, the external surface of the port wall 150 may include two ridges 171 spaced opposite one another for engaging with the tab. In various embodiments, the number of tabs 172 and ridges 171 may vary dependent on the number of installation positions or complexity desired for removing a connector housing 166 from a port 103, 104. For example, if two ridges 171 are spaced opposite one another on the port wall 150, and the internal housing 166 included two tabs 172 disposed opposite one another, so that each tab engaged a ridge, both tabs would need to be dislodged radially outwardly to enable a reverse rotation of the housing off of the port.

In an embodiment, the opening 178 of the internal housing may have an opening sized for passage of a pre-terminated fiber optic cable 175 therethrough, such as, for example, any of the pre-terminated cable configurations, as disclosed in Provisional Application No. 61/726,342. Pre-terminated cable generally may have a factory installed (pre-installed) ferrule, or ferrules for a dual-connector cable, mounted on the cable end. In an embodiment, for example, a pre-terminated dual LC cable may have a maximum cross-sectional dimension of about 5 mm, and opening 178 may be about 6 mm in diameter. The pre-terminated cable end may be inserted through the connector housing sections 166 and 168 and then fitted with a connector body (such as, for example, any of the connector housings, as disclosed in Provisional Application No. 61/726,342) that is configured to mate with an adapter 214 (FIG. 8C) within the port 104.

FIGS. 9B and 9C show a representative fiber optic cable 175 (dashed line) disposed within a connector 108. To provide a weather-proof seal between the cable 175 and the internal housing 166 a compression grommet 176 may be provided to fit around the cable. The grommet 176 may fit into a receiving channel 178 of the internal housing 166. The receiving channel 178 may be defined by a plurality of axial extensions 179 having a first end 179a integral with the housing 166 and a second distal end 179b spaced apart from the first end. A slot 180 may be provided between the extensions 179, and such a configuration may permit radial movement of the second ends 179b so that the second ends may be pressed radially inwardly to compress the grommet 176 about the cable 175 and provide a seal around the cable. As represented in FIG. 9C, there may be four extensions 179 spaced at about 90° from another. In alternative embodiments there may be provided fewer or additional ones of the extensions, for example three extensions oriented at about 120° from one another, or six extensions oriented at about 60° from one another.

To compress the grommet 176 around the cable 175, the housing cover 168 may have a conical inner wall 184 that is configured to force the extensions 179 radially inwardly upon insertion of the cover onto the inner housing 166. As represented in FIGS. 9A-9C, the housing cover 168 may interlock with the inner housing 166 with a bayonet-type connection in a manner similar to the interlocking of the inner housing with the ports 103, 104. The external surface of the inner housing 166 may include projecting pins 186, and the housing cover 168 may have corresponding slots 188 that receive the pins therein, and as the cover is axially and rotationally inserted over the inner housing, the pins will move into a locking portion 188c of the slots to lock the housing cover with the inner housing.

In further variants, additional types of cable sealing configurations may be provided, such as, for example, a conical washer (not shown) that may fit around the cable 175 and that may have a first conical surface that matches the internal conical surface 184, and a second flat surface that seats against a flat surface of the internal housing 166 to compress the conical washer upon placing the cover 168 over the internal housing.

The housing cover 168 may also include external gripping features, such as raised axial ridges 190, that may allow for the housing cover to be more easily grasped and turned when placing the housing cover onto, or removing the housing cover from the inner housing 166. While axial ridges are shown, other gripping features, such as a textured surface or rubberized surface, for example, may also be provided.

To provide additional bend protection at the grommet seal, the outer housing may include a rigid tailpiece extension 192 that maintains the cable 175 in an essentially linear direction adjacent the seal, to thereby maintain a better seal integrity.

A general installation procedure for installing a fiber optic cable 175 (that may be factory pre-connectorized at least with a ferrule tip) and connector 108 may include inserting the fiber optic cable through each of the cover 168, the sealing grommet 176, and the inner housing 166 (that may include a pre-installed O-ring 158). A fiber optic cable end connector (not shown, but which may be any of an SC, Dual LC, LC, ST or MPO connector) may be installed on the cable, and the cable plugged into an appropriate adapter (see for example adapter 214 depicted in FIG. 8C) in a port 104. The internal housing 166 may then be inserted onto the port 104, and the grommet 176 slid into place within the channel 178. (Alternatively, the grommet 176 may be pre-installed in the channel 178, and the cable 175 may be inserted through the pre-installed grommet.) The cover 168 may then be installed over the internal housing 166 to provide a configuration as depicted in FIGS. 2A and 2B (not showing the cable).

Figure 11:
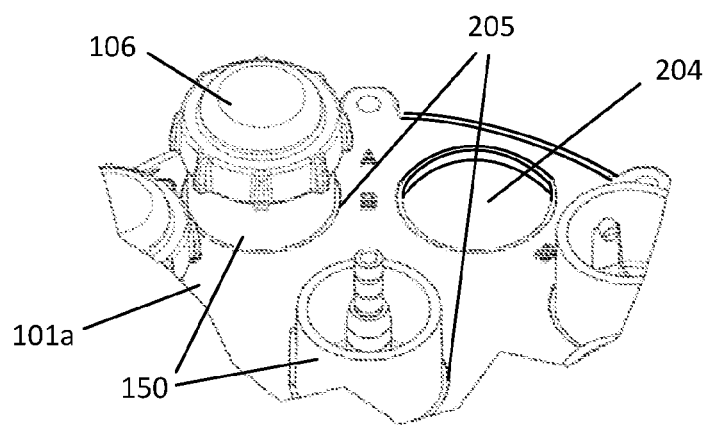
FIG. 11 depicts break-away port walls according to an embodiment.

Since all installations of a terminal 100 may not require the specific type of connector 108 shown, in an embodiment of a terminal housing 101, the ports 103, 104 on the base 101a, may be configured as knock-out ports as shown in FIG. 11, wherein one of the ports 103 is shown removed to provide an open hole/passage 204 in the base. Such a configuration may allow for alternative types of connectors to be used. In an embodiment, the material that is used for the base 101a may be thinned or weakened in an area 205 around the base of the port walls 150 so that application of a sufficient force to the walls may cause the walls to break away from the base. Any additional adapter mounting surfaces, such as mounting surfaces 210 (shown in FIGS. 8B and 12A) may either be configured to detach along with the port walls 150. Alternatively, the surfaces 210 may be individually separable, either after removal of the port walls 150, or with the port walls still in place, to provide alternative configurations, such as a configuration wherein a port wall may be present but the internal adapter mounting surfaces are removed, thereby providing even further alternative connection possibilities.

Figure 13A:
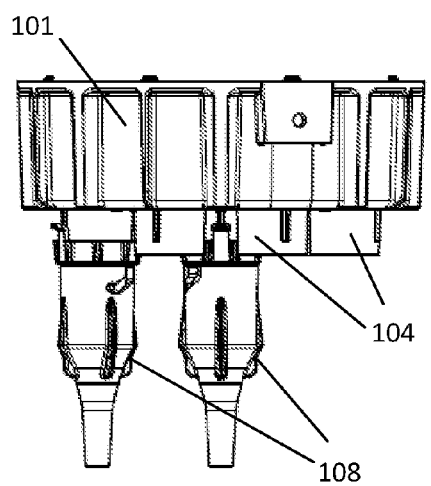
FIGS. 13A and 13B depict side and cross-sectional views of a terminal housing according to an embodiment.
Figure 13B:
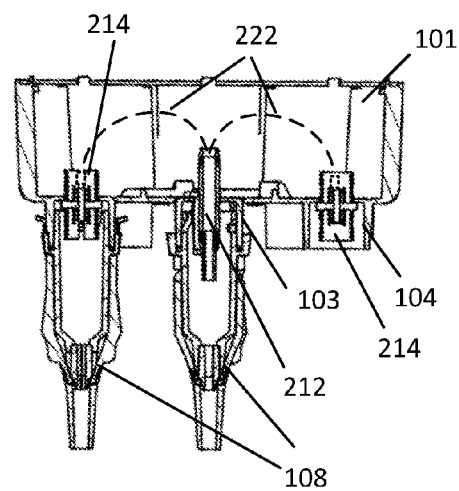

In an embodiment, within the ports 103, 104 various types of mounting configurations may be provided for accepting adapters and other types of connectors. FIGS. 12A and 12B respectively show an inside view and an outside view of the base housing 101. The ports 103, 104 may include mounting surfaces 210 that convert the round opening of the ports for mountably receiving various components therein. In an embodiment as shown, the stub cable port 103 may be configured to receive a fiber breakout assembly 212 (shown in greater detail in FIGS. 14A-14C, and the drop cable ports 104 may be configured to receive an alignment adapter 214 (shown in greater detail in FIGS. 15A, 15B). FIG. 13A provides a side view of a terminal housing 101 with connectors 108 attached thereto, and FIG. 13B shows a cross-section of the view of FIG. 13A, depicting a cross-section of a mounted fiber breakout assembly 212 as well as mounted alignment adapters 214. The mountable accessories may be inserted into the mounting surfaces 210 from within the terminal housing 101, or from externally through the ports 103, 104. The alignment adapters may be configured for receipt of any of an SC, Dual LC, LC, ST or MPO connector on either end thereof, wherein each end may be configured for the same type of connector, or the ends may each be configured for a different type of connector.

Figure 14A:
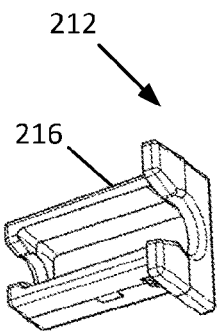
FIGS. 14A-14C provide views of a fiber optic cable breakout assembly according to an embodiment.
Figure 14B:
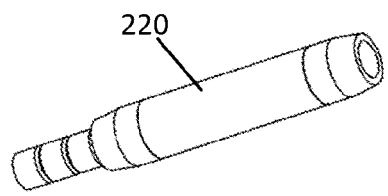
Figure 14B:
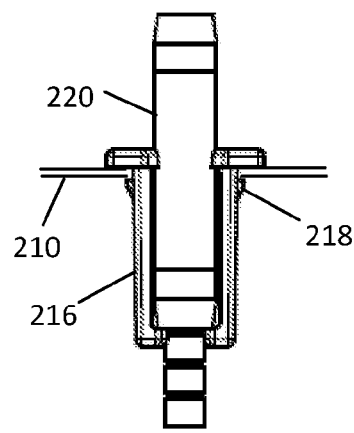
Figure 14C:
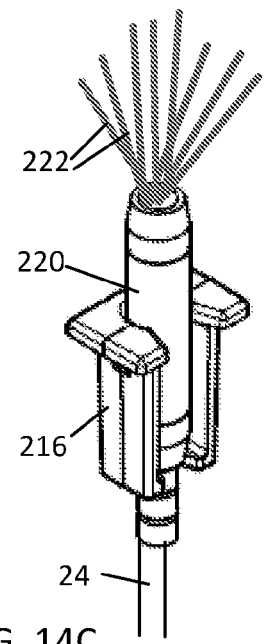

As shown in FIG. 14A-14C, the fiber breakout assembly may include a mounting bracket/holder 216 that is insertable into the mounting surfaces 210 (FIG. 14B). The bracket 216 may include retention tabs 218 that are resiliently displaceable inwardly to allow for the bracket to pass through the opening of the mounting surface, and once through, spring back into their original position as shown to hold the bracket in place. A fiber breakout tube 220 may be inserted within the bracket 216. In an embodiment, the tube 220 and bracket 216 may be configured so that the tube may be inserted into the bracket prior to installation in the housing. Alternatively, the bracket may be inserted into the housing first, and the tube may be sliding inserted into the bracket.

The fiber breakout tube 220 with a stub cable 24 (FIG. 1) may be provided at the end of the stub cable to join the stub cable with the terminal 100 through the stub port 103. As represented in FIG. 14C, the stub cable 24, with its individual fiber optic cables therein, may enter the tube 220 from one end of the tube, and the individual fiber optic cables 222 may be dispersed from the other end, from which the individual fiber optic cables may be directed to ones of the drop cable ports 104. The ends of the cables 222 may be terminated with ferrule ends and corresponding plug-in connector housings (SC, Dual LC, LC, ST or MPO) that may be configured to connect with the alignment adapters 214 in the drop cable ports 104. Such a connection scheme is schematically illustrated in FIG. 13B with dashed lines.

Figure 15A:
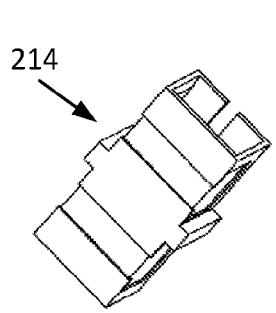
FIGS. 15A-15B provide various views of a fiber optic cable adapter according to an embodiment.
Figure 15B:
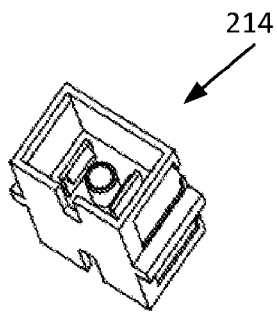

One type of adapter 214 is depicted in FIGS. 15A and 15B. Each end of the adapter 214 may be the same, or the ends may be different from one another depending on the configuration of fiber optic cables and connectors being used.

Figure 16A:
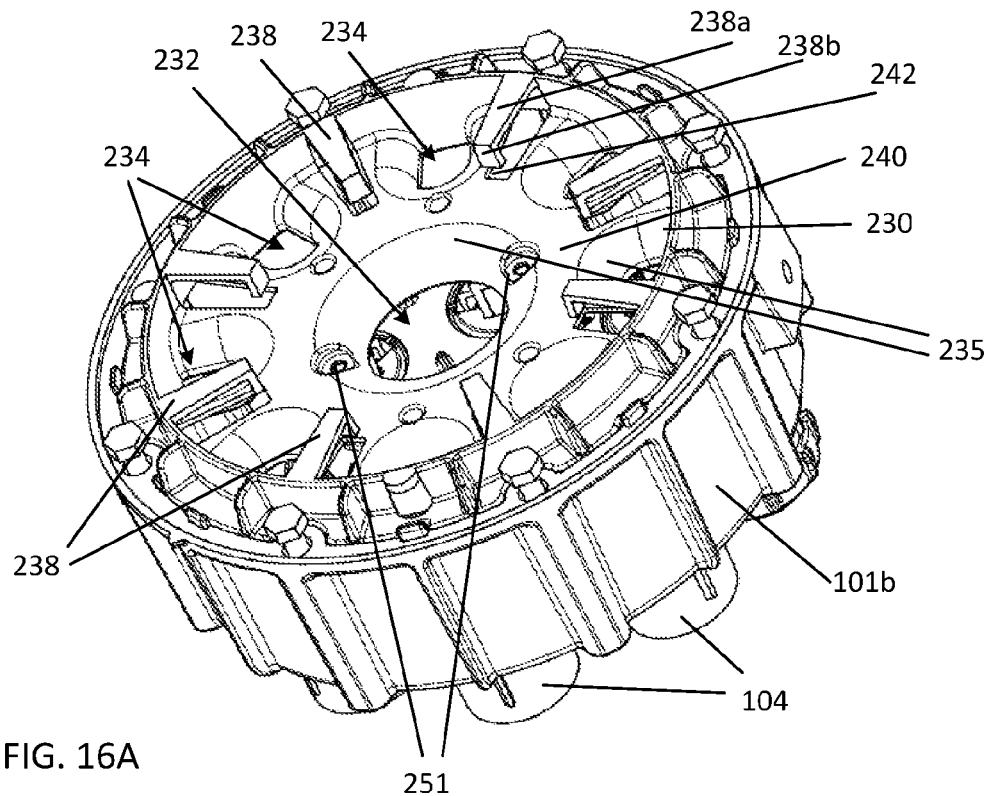
FIGS. 16A-16C depict a bulkhead and distribution of components on a bulkhead according to embodiments.
Figure 16B:
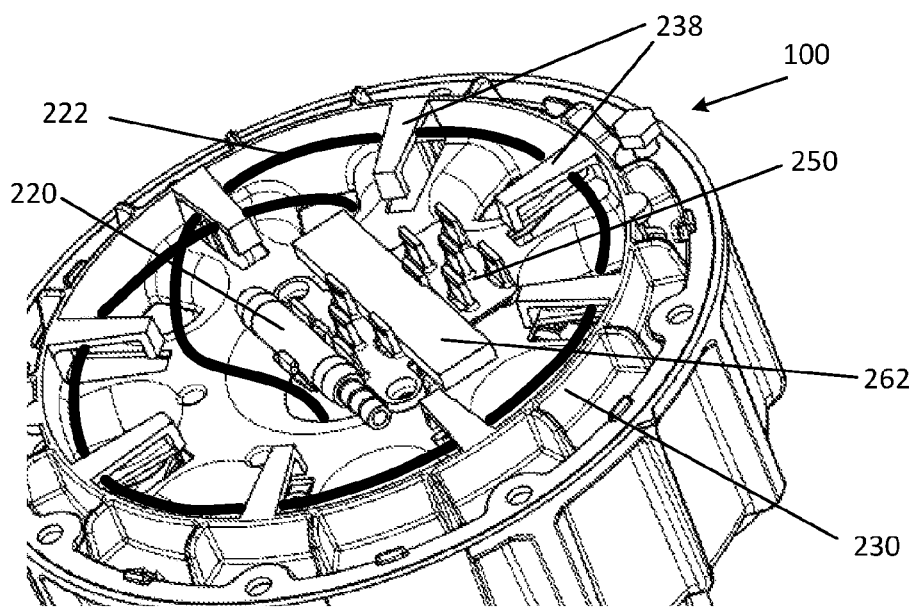

In an embodiment, as depicted in FIGS. 16A-16B, a terminal 100 may include a bulkhead 230 that may be configured to serve as a cable guide for holding, positioning and/or guiding the fiber optic cables 222 within the interior space of the housing 101, and/or organizing and holding additional components as discussed further below. While cables 222 may be dispersed to the ports 104 directly (as represented in the simplified schematic of FIG. 13B, a bulkhead 230 may be provided to better manage distribution and location of the cables within the housing.

Figure 18A:
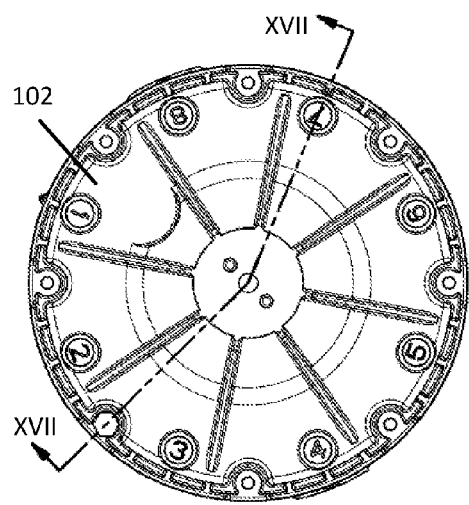
FIGS. 18A-18C provide assembled views of a cover and bulkhead with a housing wall according to an embodiment.
Figure 18B:
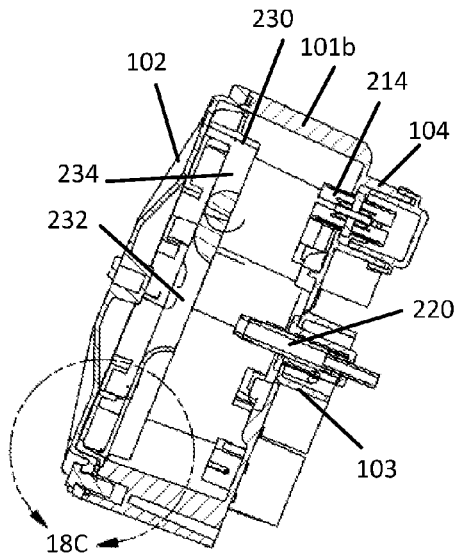

In an embodiment as represented in FIGS. 16A, 16B, and the cross-sectional view in FIG. 18B, the bulkhead 230 may include a central opening 232 located essentially above the port 103, and openings 234 located above each of the ports 104 for passage of fiber optic cables therethrough in a manner as represented in FIG. 16B. The bulkhead 230 may be configured with curved edges 235 forming each of the openings 232, 234 to facilitate curvature of the cable 222 and eliminate any sharp edges that may cut into or abrade a cable after positioning of a cable.

The bulkhead 230 may also include a plurality of arms 238 that are configured to hold any cables 222 in place on the surface 240 of the bulkhead providing a fiber routing and slack storage area for fiber cables. Each of the arms 238 may have a radially inwardly extending portion 238a that may be spaced a distance above the surface 240 to provide room for coiling of extra cable 222 within the bulkhead. On the radially inward end of each arm portion 238a there may be an axially extending arm portion 238b that extends towards the surface 240 but which forms an opening 242 that is configured to allow the cables 222 to be inserted therethrough in a sideward direction of movement of the cables. Since coiled cable has a natural tendency to want to uncoil, cables will tend to move radially outwardly towards the outer wall and away from the opening 242 once inserted under the arms 238.

FIG. 16B depicts an example of a cable 222 passing centrally through the bulkhead 230 through the central opening 232, forming one complete loop around the perimeter of the bulkhead under the arms 238, and passing downwardly through the bulkhead through an opening 234. If desired, additional cable loops of the cable 222 may be made within the bulkhead 230.

Figure 16C:
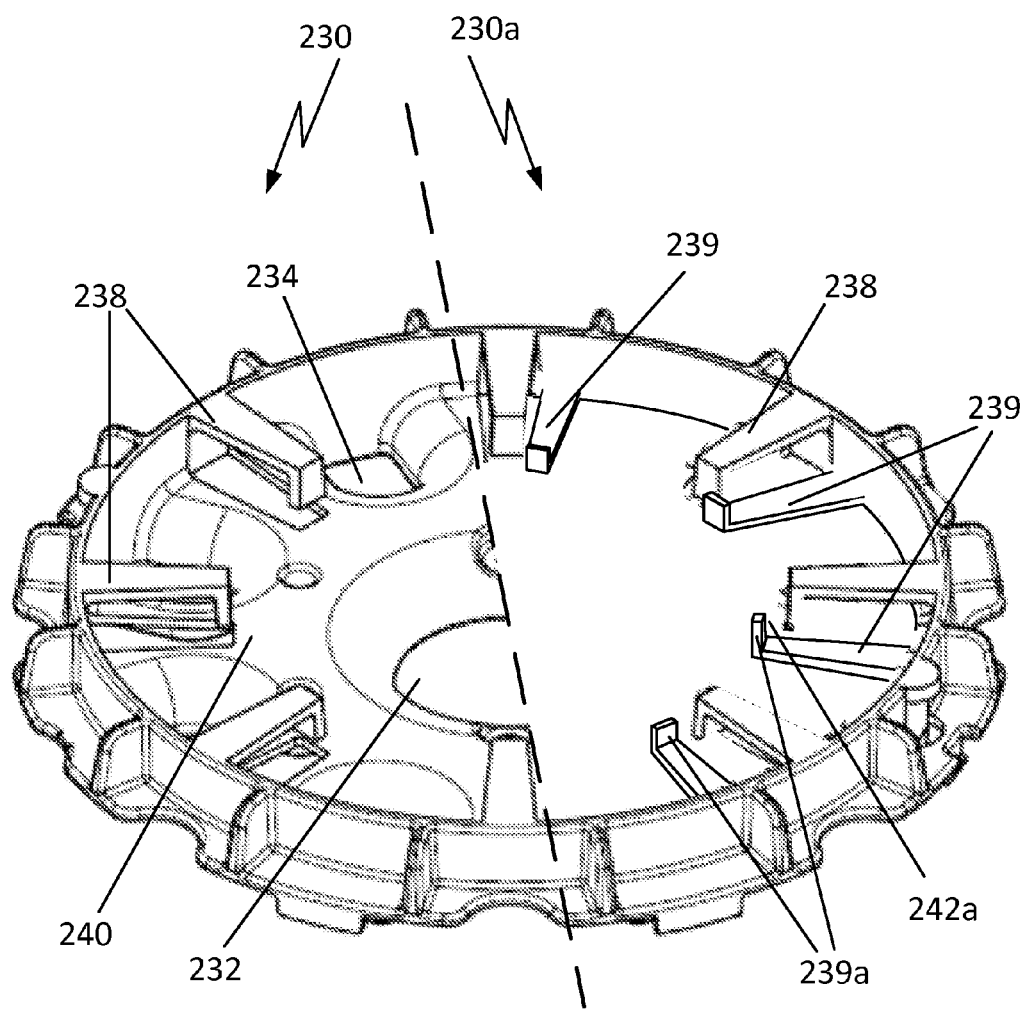

FIG. 16C depicts a split view of bulkhead embodiments, wherein the left-hand side show a bulkhead 230 as generally described above, and the right hand side depicts a variant bulkhead 230a that does not include a surface 240. Instead of the surface 240, the bulkhead 230a may include opposing arms 239 that, together with the arms 238, may provide a receiving area for coiling of extra cable within the bulkhead. Arms 239 may include radially inwardly extending arm portions 239a and axial arm extensions 239b. Extensions 239b may extend parallel with arm sections 238b, and may be spaced radially apart to define opening 242a for passage of cable between the arms. Bulkhead variant 230a may therefore require less material and be less expensive, while still providing a degree of cable organization within the terminal.

In an embodiment, a terminal 100 may be pre-made at the manufacturer as a terminal end of a stub cable 24, and any cables 222 may be direct cables coming from the stub cable 24 (FIG. 14C) and may have pre-terminated cable ends that are connected into adapters in the ports 104. Alternatively, a terminal 100 may be installed on a stub cable 24 on site, wherein ends of the fiber optic cables 222 of the stub cable may need to be spliced to additional cable portions that may have pre-terminated cable ends that are connected into adapters in the ports 104. In another possible scenario, a fiber optic cable 222 from the stub cable 24 may need to provide a feed to two, or more outgoing cables, thereby requiring a splitter to be installed.

For accommodation of additional accessories, such as splice tubes 260 (see FIG. 18A), a splitter 262, or possibly an extra fiber breakout tube 220, a holder attachment 250 may be installed within the interior portion of the arms 238. The bulkhead 230 may include fastening sites 251, that may be threaded openings, for example, for receiving bolts/screws therein. Alternatively other types of fastening systems may be used, such as releasable tabs or snaps.

In an embodiment as represented in FIGS. 16B and 17A-17C, a holder attachment 250 may include a variety of holder configurations. For example, the holder 250 may include a clasp 252 configured to hold a breakout tube 220. In addition, the holder 250 may include a base portion 254 that may be configured to accommodate a variety of additional components. The base portion 254 may include a plurality of breakaway tabs 256 that may be spaced apart to either directly accommodate accessories, such as splice tubes 260 (represented in FIGS. 17A and 17B), or which may be broken away to provide larger areas to accommodate accessories having a larger size, such as a splitter 262 (represented in FIG. 16B). In an embodiment, the splice tubes 260 may be of a size that allows for two splice tubes to fit into one space between the tabs 256 as represented in FIG. 17B. Once a fiber cable splice is made in a tube 260 the tube may be positioned in the holder 250.

To provide an additional retentive function, the distal ends of the tabs 256 may include a catch 257. Tabs 256 may be resiliently displaceable and the catches 257 may include a canted surface 257a to allow for insertion of an accessory, wherein the tabs may be displaced slightly to allow for the accessory to be slid past the catches. A squared surface 257b, may hinder removal of the accessories, once installed.

In addition, if an accessory is of a size which does not match the spacing between tabs 256, a plurality of slots 258 may be provided in the base 254 through which, after possibly removing tabs to create a cleared space to accommodate the accessory, alternative fastening devises may be inserted, such as, for example, adjustable plastic ties or wire twist ties (not shown), and wrapped around the base and accessory. Alternatively, or in addition to any of the above attachment configurations, a more permanent attachment may be achieved by the use of an adhesive.

The holder attachments 250 may include fastening tabs 270 that are configured for receiving a bolt/screw to fasten into the fastening sites 251 of the bulkhead 230.

Figure 18C:
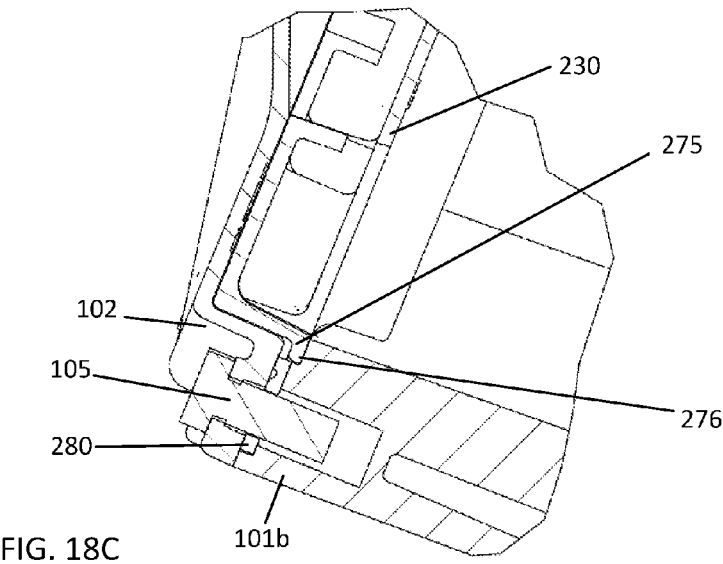

The bulkhead 230 may seat into, or on the open end of the housing wall 101b, opposite the base 101a. In an embodiment the bulkhead 230 may fit within the housing wall 101b by means of a friction fit. Alternatively, the bulkhead 230 may be fastened to the wall 101b be some type of fastening arrangement, such as clips, engagement tabs, or screws. FIGS. 18A-18C depict an embodiment of a terminal housing wherein the bulkhead 230 includes a peripheral edge 275 that seats within notches 276 on the inside of the housing wall 101b. The cover 102 may be configured to match at least a portion of the contour of the bulkhead 230 and abut the bulkhead. Thereby no additional fasteners may be necessary to retain the bulkhead in place.

FIG. 18C also depicts a cross-sectional view of a sealing gasket 280 that may be inserted between the housing wall 101b and the cover 102 to provide a water-tight seal therebetween.

Figure 19A:
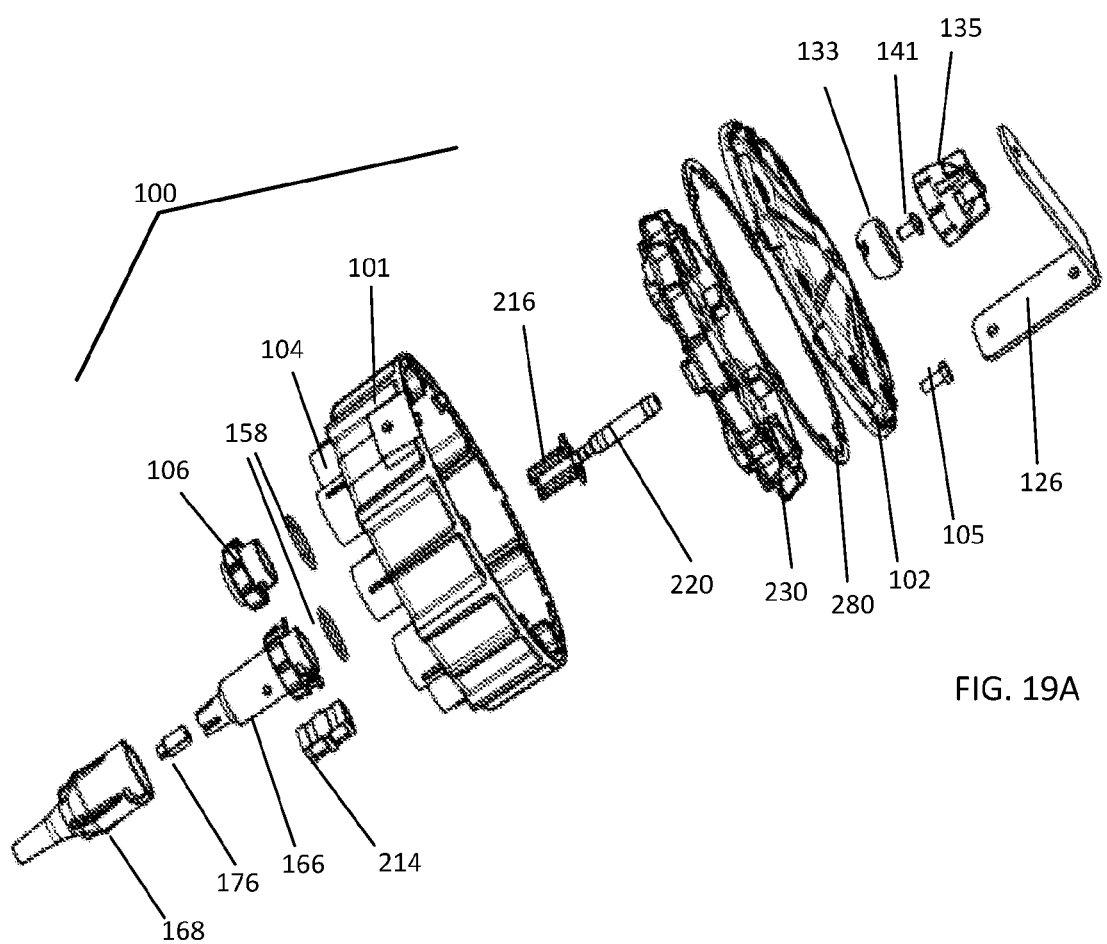
FIGS. 19A-19B provide disassembled/exploded views of components of a multi-port terminal according to an embodiment.
Figure 19B:
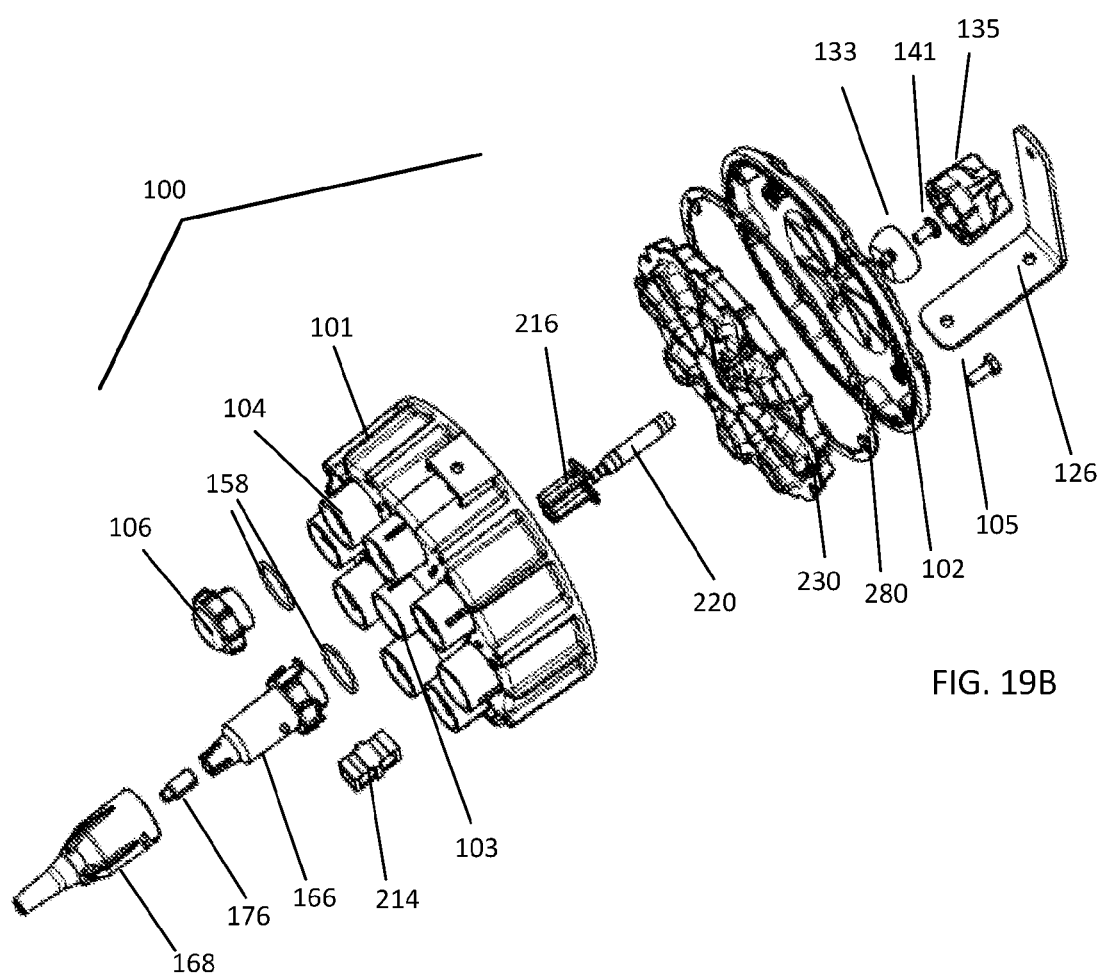

FIGS. 19A and 19B provide exploded views of major components of an embodiment of a multi-port terminal 100.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A multi-port connection terminal for optical fibers, the terminal comprising:
   a housing comprising a first housing portion, and a second housing portion attachable to the first housing portion to define an interior space within the housing, at least one of the first housing portion and the second housing portion defining a perimetrical wall disposed about at least a portion of the interior space;
   a plurality of connector ports provided in one of the first housing portion and the second housing portion and extending through the housing portion from the interior space to an exterior space outside of the housing; and
   a fiber routing and slack storage system disposed radially inwardly adjacent the perimetrical wall around at least a portion of the interior space for routing and storing excess lengths of optical fiber within the internal cavity.

2. The multi-port connection terminal of claim 1, wherein:
the perimetrical wall is an exterior wall having at least one interior surface disposed towards the interior space; and
the fiber routing and slack storage system comprises inwardly disposed arms extending away from the interior surface and configured for routing and storing excess lengths of optical fiber adjacent the interior surface.

3. The multi-port connection terminal of claim 2, wherein the perimetrical wall is cylindrical, and the fiber routing and slack storage system comprises a disc-shaped member having a surface, and a circumferential edge disposed about the surface for being disposed adjacent the interior surface of the perimetrical wall, and the disc-shaped member comprising the radially inwardly disposed arms extending radially inwardly from the circumferential edge, substantially parallel to the surface, and spaced axially away from the surface.

4. The multi-port connection terminal of claim 3, wherein:
the first housing portion comprises:
a base comprising the plurality of connector ports; and
the cylindrical perimetrical wall extending from the base, the cylindrical perimetrical wall having an annular edge disposed away from the base;
the second housing portion comprises a domed cover for being disposed on the annular edge of the cylindrical perimetrical wall to enclose the interior space;
the disc shaped member comprises a bulkhead that fits within the annular edge of the cylindrical perimetrical wall to divide the interior space into a base portion between the base and the bulkhead, and cover portion between the bulkhead and the cover, with the radially inwardly disposed arms disposed in the cover portion; and
the disc-shaped member comprises an opening corresponding and aligned with each connector port in the base for passage of optical fibers therethrough from the fiber routing and slack storage system to corresponding ones of the connector ports.

5. The multi-port connection terminal of claim 4, wherein:
the base is disc-shaped and comprises one connector port in the center thereof and any additional ones of the connector ports disposed concentrically around the center connector port;
the center port comprises a port for entry of a stub cable into the interior space, the stub cable comprising a plurality of optical fibers; and
the concentrically disposed ports being configured for receiving a terminal end of at least one of the optical fibers therein.

6. The multi-port connection terminal of claim 5, wherein the connector ports comprise:
a cylindrical port wall extending externally away from the base, and configured for receiving and retaining thereon at least one of a connector housing and a cap; and
a base portion disposed within the cylindrical port wall and configured for receiving and retaining a connector adapter therein, wherein terminal ends of the optical fibers of a stub cable are terminated by a fiber optic connector, and the adapter is matable with the fiber optic connector.

7. The multi-port connection terminal of claim 6, wherein at least one of the base portion within the cylindrical port wall, and the cylindrical port wall is removable to provide an opening for alternate connector adapters.

8. The multi-port connection terminal of claim 6, further comprising connector housings for mating with the cylindrical port walls, the connector housings comprising:
an internal housing portion configured for receiving a pre-terminated optical fiber cable therethrough, the internal housing portion having an opening for receiving the optical fiber cable therethrough and comprising a mating portion for mating with the cylindrical port wall; and
an external housing portion configured for being disposed about and engaging the internal housing portion to at least form a weather-tight seal about the fiber optic cable.

9. The multi-port connection terminal of claim 8, wherein:
the cylindrical port wall and mating portion of the inner housing portion comprise a first bayonet-type connection for retaining the inner housing portion with the cylindrical port wall; and
the external housing portion and inner housing portion comprise a second bayonet-type connection for retaining the external housing portion with the inner housing portion.

10. The multi-port connection terminal of claim 9, wherein:
the mating portion of the inner housing portion comprise a cylindrical wall that fits within the cylindrical port wall, and the first bayonet-type connection comprises at least one pin extending radially inwardly from the cylindrical port wall and at least one corresponding slot in the inner housing cylindrical wall; and
the internal housing portion comprises a cylindrical exterior surface, the external housing portion comprises a cylindrical wall that fits around the cylindrical exterior surface of the internal housing portion, and the second bayonet-type connection comprises at least one pin extending radially outwardly from the cylindrical exterior surface and at least one corresponding slot in the cylindrical wall of the external housing portion.

11. The multi-port terminal of claim 8, wherein the mating portion of the inner housing portion comprise a wall portion for engaging the cylindrical port wall, and at least one of the cylindrical port wall and the wall portion comprises a locking feature for locking the inner housing portion to the cylindrical port wall.

12. The multi-port terminal of claim 8, wherein:
the mating portion of the inner housing portion comprises a first internal cylindrical wall that fits internally within the cylindrical port wall, and a second external cylindrical wall disposed about at least a portion of the first internal cylindrical wall that fits externally around the cylindrical port wall;
the cylindrical port wall comprises at least one pin extending radially inwardly from the cylindrical port wall, the internal cylindrical wall comprises at least one corresponding slot for receiving the pin therein, and the at least one pin and corresponding slot comprise a bayonet-type connection requiring an axial and rotational movement of the mating portion with respect to the cylindrical port wall to engage the mating portion with the cylindrical port wall;
the cylindrical port wall has an exterior surface comprising at least one axial ridge extending axially along at least a portion of the cylindrical port wall, the ridge having a first beveled longitudinal edge extending outwardly from the exterior surface in a direction of the rotational movement of the mating portion into engagement with the cylindrical port wall, and a second radially disposed longitudinal edge spaced circumferentially from the first edge; and the second external cylindrical wall of the inner housing portion comprises a radially displaceable tab having a first position and configured to be displaceable radially outwardly from the first position to move over the axial ridge upon rotational movement of the mating portion into engagement with the cylindrical port wall and returnable radially inwardly to the first position upon moving past the second radially disposed longitudinal edge for engaging with the second radially disposed edge upon rotational movement of the mating portion in an opposite direction to inhibit removal of the inner housing portion from the cylindrical port wall.

13. The multi-port connection terminal of claim 3, wherein the radially inwardly disposed arms have a first end integral with the circumferential edge, and a second end distal from the first end, wherein the second end comprises an axial extension extending towards the disc surface and defining an entry slot between the axial extension and the surface for passage of an optical fiber therethrough.

14. The multi-port connection terminal of claim 1, wherein at least one of the first housing portion and the second housing portion comprises a plurality of hanging features disposed spaced apart at locations about the at least one of the first housing portion and the second housing portion for supportively hanging the terminal from a support structure in a plurality of variant hanging positions.

15. The multi-port connection terminal of claim 14, wherein:

the first housing portion comprises:
a base comprising the plurality of connector ports; and
the perimetrical wall extending from the base, the perimetrical wall comprising a cylindrical perimetrical wall having an annular edge disposed away from the base;

the second housing portion comprises a domed cover for being disposed on the annular edge of the cylindrical perimetrical wall to enclose the interior space, the domed cover having an apex; and at least one of the hanging features comprises a ball and socket mount disposed on the apex of the cover with one of the ball and socket fixedly attached to the cover and the other of the ball and socket being configured for attachment to a support structure, the ball is removable from the socket, and the ball and socket comprise a snap fit connection for retaining the ball within the socket.

16. The multi-port connection terminal of claim 15, wherein at least one other of the hanging features comprises at least one receiving slot in the perimetrical wall, the receiving slot being configured for slidably receiving a hanger therein.

17. A multi-port connection terminal for optical fibers, the terminal comprising:

a housing comprising:
a first housing portion comprising a base and a cylindrical perimetrical wall extending from the base, the cylindrical perimetrical wall having an annular edge disposed away from the base; and
a cover for being attached on the annular edge of the cylindrical perimetrical wall to, together with the first housing portion, define an interior space;

a plurality of connector ports disposed in the base and extending through the base from the interior space to an exterior space outside of the housing; and at least one hanging features disposed on at least one of the first housing portion and cover for supportively suspending the terminal from a support structure with the base oriented downwardly.

18. The multi-port connection terminal of claim 17, wherein the at least one hanging feature comprises a plurality of hanging features disposed spaced apart at locations about the at least one of the first housing portion and the second housing portion for supportively hanging the terminal from a support structure in a plurality of positions.

19. The multi-port connection terminal of claim 17, wherein the at least one hanging feature comprises a ball and socket mount disposed on the cover with one of the ball and socket fixedly attached to the cover and the other of the ball and socket being configured for attachment to a support structure, the ball is removable from the socket, and the ball and socket comprise a snap fit connection for retaining the ball within the socket.

20. The multi-port connection terminal of claim 17, further comprising connector housings for mating with the connector ports, the connector housings comprising:

an internal housing portion configured for receiving a pre-terminated optical fiber cable therethrough, the internal housing portion having an opening for receiving the optical fiber cable therethrough and comprising a mating portion for mating with the connector port; and an external housing portion configured for being disposed about and engaging the internal housing portion to at least form a weather-tight seal about the fiber optic cable.

* * * * *